United States Patent Office 3,817,841
Patented June 18, 1974

3,817,841
SEPARATING ADIPONITRILE FROM MIXTURES
David William Bonniface and David Brian Catlow, Stockton-on-Tees, England, assignors to Imperial Chemical Industries Limited, London, England
No Drawing. Filed Jan. 2, 1973, Ser. No. 320,179
Claims priority, application Great Britain, Jan. 19, 1972, 2,638/72
Int. Cl. C07c *121/26*
U.S. Cl. 203—29                     4 Claims

ABSTRACT OF THE DISCLOSURE 2-cyanocyclopenten-(1)-ylamine is removed as an impurity from crude adiponitrile by distilling to give a low-boiling fraction containing adiponitrile and the said impurity, and high-boiling fraction containing adiponitrile and higher boiling material, combining the two fractions, adding water and heating to hydrolyse the said impurity, and then distilling to recover adiponitrile.

---

This invention relates to a process for separating adiponitrile from admixture with 2-cyanocyclopenten-(1)-ylamine.

Adiponitrile is an important intermediate in the sequence of chemical stages leading to certain polyamides known as the nylons. Thus hydrogenation of adiponitrile gives hexamethylene diamine which on polycondensation with dicarboxylic acids gives nylon polymers, for example polycondensation with adipic acid gives nylon 6,6 the well-known fibre-forming polyamide. High purity in nylon intermediates is essential, and adiponitrile is no exception to this.

Crude adiponitrile, especially when made by dehydrative animation of adipic acid, contains significant amounts of 2-cyanocyclopenten-(1)-ylamine from which it is difficult to separate efficiently by distillation because these substances have boiling points very close to each other. Thus at a pressure of 10 mm. mercury adiponitrile boils at 155° C. and 2-cyanocyclopenten-(1)-ylamine at 148° C. Moreover, at this pressure the melting point of 2-cyanocyclopenten-(1)-ylamine is very close to its boiling point so that it very readily solidifies in transfer lines, condensers and receivers with resulting blockages, and in order to obviate this it is necessary, in removing this component by distillation from crude adiponitrile, deliberately to remove with it a large proportion of adiponitrile in order to maintain the distillate in a liquid form. This leads to waste of valuable adiponitrile. In order to overcome this separation difficulty it has been proposed to hydrolyse the 2-cyanocyclopenten-(1)-ylamine to 2-cyanocyclopentanone which is of much lower boiling point. Hydrolysis methods hitherto proposed involve the use of strong acids, ammonium salts, bisulphates or bisulphites. All such methods introduce fresh problems since insoluble inorganic substances tend to separate from the organic material producing corrosion, blockage and other difficulties. Consequently hydrolysis of 2-cyanocyclopenten-(1)-ylamine by these means is not a successful commercial method of dealing with this troublesome impurity in crude adiponitrile.

In copending U.K. application No. 34,624/71, corresponding with U.S. application Ser. No. 274,428, filed July 24, 1972, we have described a process for removing 2-cyanocyclopenten-(1)-ylamine from a mixture with adiponitrile which comprises heating said mixture with water substantially free from dissolved inorganic matter under pressure at temperatures of 150° C. to 280° C., and subsequently separating adiponitrile from the hydrolysis products by distillation.

We have now found a modified method of removing 2-cyanocyclopenten-(1)-ylamine from crude adiponitrile.

Our invention provides a process for removing 2-cyanocyclopenten-(1)-ylamine from crude adiponitrile which comprises subjecting the crude adiponitrile to fractional distillation or a sequence of fractional distillations and separating therefrom, a lowboiling fraction containing 2-cyanocyclopenten-(1)-ylamine and adiponitrile, and a high-boiling fraction containing adiponitrile and substances of higher boiling point, combining the said two fractions, adding water and heating so as to hydrolyse the 2-cyanocyclopenten-(1)-ylamine and separating adiponitrile from the resulting mixture by distillation.

By combining the fraction containing 2-cyanocyclopenten-(1)-ylamine with the fraction containing substances of higher boiling point than adiponitrile it is possible to carry out the hydrolysis at atmospheric pressure. In the process described in co-pending U.K. application No. 34,624/71, which is carried out under pressure, the ammonia formed in the hydrolysis tends to inhibit the hydrolysis reaction, and it is an optional feature of that process that ammonia is removed by releasing steam so as to promote further hydrolysis. Release of steam, however, leads to the loss of the water required for hydrolysis and also leads to the loss of adiponitrile by entrainment. By carrying out our present process under atmospheric pressure, however, by use of a suitable reflux it is possible to remove the ammonia formed in the hydrolysis without loss of water or adiponitrile. Moreover, an expensive pressure vessel is not required. Again, in our prior process there is greater loss of low-boiling material during hydrolysis by conversion to tars, presumably by condensation reactions, than there is in the process of our present invention.

The temperature of hydrolysis in the process of our invention may vary from 130° C. to 280° C. However, if operation is limited to atmospheric pressure, as will normally be the case, the upper limit of temperature will be about 190° C. If the hydrolysis mixture is boiled under reflux at atmospheric pressure the temperature of the mixture will rise as hydrolysis proceeds within the temperature range 135° to 190° C.

The amount of water added will normally be such as to maintain reflux within this temperature range. More than this may be added initially, of course, provided sufficient water is then distilled off to achieve the desired temperature conditions for reflux. The amount of water added will normally be from 1% to 10% by weight of the combined low-boiling and high-boiling fractions.

The proportion of high-boiling fraction to low-boiling fraction will normally be at least 2:1 by weight and may be as high as 10:1. A preferred range is from 3:1 to 5:1.

The time of heating will be that required to effect the necessary hydrolysis which, when the hydrolysis is effected at atmospheric pressure, means the time required to bring about the desired rise in the temperature of reflux. This time will normally be from 1 to 5 hours. Although longer times are not precluded, prolonging the time unnecessarily increases the chances of undesirable hydrolysis of adiponitrile itself.

The proportion of 2-cyanocyclopenten-(1)-ylamine in the low-boiling fraction may vary, for example from 15% to 40% by weight. The proportion of substances of higher boiling point than adiponitrile in the high-boiling fraction may vary, for example from 5% to 40% by weight. The high-boiling substances normally include δ-cyanovaleramide as the principal component together with smaller amounts of δ-cyanovaleric acid and condensation products.

After carrying out the hydrolytic treatment the resulting mixture may be distilled to remove water and low-boiling material. The residue, consisting of adiponitrile and higher-boiling material, may be distilled as a separate operation or it may be added to the crude adiponitrile for fractionation in the normal distillation train. Indeed when the latter procedure is adopted it is necessary initially to remove only the water from the hydrolysis mixture since the hydrolysis products of 2-cyanocyclopenten-(1)-ylamine, principally 2-cyanocyclopentanone, create no problem in the normal distillation train and indeed may be advantageous since they have the unexpected effect of minimising separation of solid 2-cyanocyclopenten-(1)-ylamine in condensers.

The low-boiling and high-boiling fractions used in our invention are obtained from crude adiponitrile by fractional distillation. This can be a simple fractional distillation in which the low-boiling fraction consists of the fraction or one of the fractions removed before the principal cut of adiponitrile itself and the high-boiling fraction consists of the residue remaining after that cut. The refining of adiponitrile by distillation, however, may consist of a more complicated sequence of fractional distillations, and appropriate low-boiling and high-boiling fractions may be obtained from such a sequence. For example, the crude adiponitrile after an initial topping distillation, principally to remove water, may be subjected to a flash evaporation under reduced pressure in which all but the higher-boiling material is distilled. This undistilled residue may constitute a high-boiling fraction of our process. The condensed distillate from the evaporator may be redistilled to take off the low-boiling material and this distillate, possibly after a further concentration by distillation, may constitute the low-boiling fraction of our process. The residue from which the low-boiling material has been distilled may then be distilled to remove the bulk of the refined adiponitrile and the undistilled residue may also constitute a high-boiling fraction of our process.

The application of our invention to a continuous process for the manufacture and refining of adiponitrile enables about 80% of the 2-cyanocyclopenten-(1)-ylamine formed to be purged from the system. The principal hydrolysis product is 2-cyanocyclopentanone and over one half of the residual low-boiling impurity consists of this substance which, because of its lower boiling point, is much more readily separated from adiponitrile by distillation. Moreover, the presence of 2-cyanocyclopentanone assists in the removal of 2-cyanocyclopenten-(1)-ylamine by distillation since it can replace at least a part of the adiponitrile which normally has to be removed with the latter in order to prevent its solidification.

By means of the invention, therefore, total yields of pure adiponitrile may economically be increased since an adiponitrile-containing fraction which has hitherto been discarded can be treated in a simple manner for the recovery of much of its adiponitrile content.

The invention is illustrated but not limited by the following examples in which the parts and percentages are by weight.

EXAMPLE 1

Water was added to a mixture of 200 parts of a low-boiling fraction obtained from the fractional distillation of crude adiponitrile and containing 130 parts of adiponitrile and 60 parts of lower-boiling material, principally 2-cyanocyclopenten-(1)-ylamine, with 600 parts of a high-boiling fraction obtained from the fractional distillation of crude adiponitrile and containing 480 parts of adiponitrile, and the resulting mixture distilled at atmospheric pressure with removal of water until the temperature of the mixture reached 145° C. The amount of water then present was 5% by weight of the combined fractions. The mixture was then boiled under reflux for 2½ hours by which time the temperature of the mixture had risen to 148° C. Water was then distilled off at atmospheric pressure until the temperature of the mixture reached 180° C. The pressure was then reduced to 10 mm. mercury and a low-boiling fraction (about 10% by weight of the mixture) distilled off through a packed column at a reflux ratio of 5:1. Distillation was then continued under total take-off conditions and 563 parts of adiponitrile of 95% strength were obtained containing 1.2% of 2-cyanocyclopenten-(1)-ylamine and 0.6% of 2-cyanocyclopentanone with no other detectable low-boiling impurities. This is equivalent to an 82% recovery of adiponitrile.

When 600 parts of the high-boiling fraction were subjected to a similar fractional distillation under reduced pressure 473 parts of 95% adiponitrile were obtained. Hence the amount of adiponitrile recovered from the low-boiling fraction is 90 parts of 95%, equivalent to about 70% of that originally present in this fraction. This adiponitrile would formerly have been discarded along with the 2-cyanocyclopenten-(1)-ylamine present in it.

EXAMPLE 2

Water was added to a mixture of 200 parts of the low-boiling fraction used in Example 1 with 600 parts of the high-boiling fraction used in Example 1, and the resulting mixtures distilled at atmosphereic pressure with removal of water until the temperature of the mixture reached 135° C. The amount of water then present was approximately 5% by weight of the combined fractions. The mixture was then boiled under reflux for 5 hours by which time the temperature of the mixture had risen to 150° C. The pressure was then reduced and water distilled off and discarded. The remainder was then fractionally distilled at a pressure of 10 mm. mercury and four fractions collected as follows:

Fraction 1: 25 parts—discarded
Fraction 2: 31 parts—
Fraction 3: 27 parts—2.9% imine, 4.9% ketone
Fraction 4: 530 parts—1.3% imine, 0.9% ketone "Imine" is 2-cyanocyclopenten-(1)-ylamine, and "ketone" is 2-cyanocyclopentanone.

The total adiponitrile in fractions 2, 3 and 4 represents a 90% recovery of adiponitrile in the high-boiling fraction and 90% recovery of that in the low-boiling fraction.

EXAMPLE 3

15 parts of water were added to a mixture of 150 parts of the low-boiling fraction used in Example 1 and 600 parts of a different high-boiling fraction from that used in Examples 1 and 2 and the mixture boiled under reflux at atmospheric pressure for 2½ hours, the temperature of the mixture rising from 165° C. initially to 180° C. The pressure was then reduced and water distilled off and discarded. The remainder was then fractionally distilled at a pressure of 10 mm. mercury and five fractions collected as follow:

Fraction 1: discarded
Fraction 2: 18 parts—18% ketone, 4.8% imine
Fraction 3: 17 parts—14% ketone, 4.3% imine
Fraction 4: 19 parts—8.7% ketone, 5.6% imine
Fraction 5: 348 parts—2.3% ketone, 1.7% imine When 600 parts of the high-boiling fraction were subjected to fractional distillation under reduced pressure 281 parts of 95% adiponitrile were obtained. Hence the recovery of adiponitrile from the low-boiling fraction in fractions 4 and 5 is aproximately 80% of that originally present in that fraction.

What is claimed is:

1. A process for removing 2 - cyanocyclopenten-(1)-ylamine from crude adiponitrile containing said 2-cyanocyclopenten-(1)-ylamine and substances of higher boiilng point than adiponitrile formed in the manufacture of said adiponitrile, which comprises subjecting the crude adiponitrile to fractional distillation or a sequence of fractional distillations and separating therefrom, in addition to an adiponitrile fraction,
 (1) a fraction of lower boiling point than adiponitrile and consisting essentially of adiponitrile with 15 to 40% by weight of the 2-cyanocyclopenten-(1)-ylamine, and
 (2) a fraction of higher boiling point than adiponitrile and consisting essentially of adiponitrile with from 5 to 40% by weight of said substances of higher boiling point than adipontitrile, adding the higher boiling fraction (2) to the lower boiling fraction (1) in a ratio by weight of from 2:1 to 10:1, adding water to the so mixed fractions in the amount of 1 to 10% by weight of the combined fractions, heating at a temperature of 130° to 280° C. for at least 1 hour to hydrolyse the 2-cyanocyclopenten-(1)-ylamine, and distilling the product to obtain adiponitrile.

2. The process of claim 1 in which the hydrolysis is effected at atmospheric pressure at a temperature of 130° to 190° C.

3. The process of claim 1 in which the proportion of high-boiling fraction to low-boiling fraction is from 3:1 to 5:1 by weight.

4. The process of claim 1 in which the product obtained by heating said mixture in the presence of water, after distilling off the water, is added to crude adiponitrile for distillation to separate adiponitrile.

References Cited

UNITED STATES PATENTS

| 2,748,065 | 5/1956 | Trieschmann et al. 260—465.8 R X |
| 3,671,566 | 6/1972 | Decker et al. 260—465.2 |
| 3,451,900 | 6/1969 | Gey et al. 260—465.8 X |

JOSEPH P. BRUST, Primary Examiner

U.S. Cl. X.R.

203—85, 95; 260—464, 465.2, 465.4, 465.8 R